United States Patent [19]

Califano

[11] Patent Number: 5,073,962
[45] Date of Patent: Dec. 17, 1991

[54] GENERALIZED NEIGHBORHOODS PARAMETER TRANSFORM FOR IMAGE FEATURES EXTRACTION

[75] Inventor: Andrea Califano, New York, N.Y.

[73] Assignee: International Business Machines Corporation, Armonk, N.Y.

[21] Appl. No.: 395,888

[22] Filed: Aug. 18, 1989

[51] Int. Cl.⁵ .............................................. G06K 9/46
[52] U.S. Cl. ...................................... 382/27; 382/28
[58] Field of Search ................................... 382/27, 28

[56] References Cited

U.S. PATENT DOCUMENTS

| | | | |
|---|---|---|---|
| 3,069,654 | 12/1962 | Hough | 340/146.3 |
| 4,135,147 | 1/1979 | Riganati et al. | 340/146.3 E |
| 4,384,336 | 5/1983 | Frankle et al. | 382/49 |

OTHER PUBLICATIONS

R. M. Bolle et al., "Visual Recognition Using Concurrent and Layered Parameter Networks", Proc. IEEE on Comp. Vision and Pattern Recognition, 1989.
A. Califano, "Feature Recognition Using Correlated Information Contained in Multiple Neighborhoods", Proc. 7th AAAI Nat'l Conf. on Artificial Intelligence, Saint Paul, Minn., Aug. 1988, pp. 831–836.
A. Califano et al., "Generalized Neighborhoods: A New Approach to Complex Parameter Feature Extraction", Proc. IEEE Conf. on Comp. Vision and Pattern Recognition 1989.
R. O. Duda et al., "Use of the Hough Transformation to Detect Lines and Curves in Pictures", Comm. of the ACM, vol. 15, No. 1, Jan. 1972, pp. 11–15.
J. A. Feldman et al., "Connectionist Models and Their Properties", Cognitive Science, vol. 6, No. 3, Jul.-Sep. 1982, pp. 205–254.
C. Kimme et al., "Finding Circles by an Array of Accumulators", Comm. of the ACM, vol. 18, No. 2, Feb. 1975, pp. 120–122.
D. Sabbah, "Computing with Connections in Visual Recognition of Origami Objects", Cognitive Science, vol. 9, No. 1, Jan.-Mar. 1985, pp. 25–50.
D. Sabbah et al., "Extraction of Surface Parameters from Depth Maps Viewing Planes and Quadrics of Revolution", Proc. SPIE Conf. Intell. Robots, and Comp. Vision, Cambridge, Mass., Oct. 1986, pp. 223–232.
S. D. Shapiro, "Feature Space Transforms for Curve Detection", Pattern Recognition, vol. 10, 1978, pp. 129–143.
J. Skansky, "On the Hough Transform for Curve Detection", IEEE Trans. on Comp., vol. 27, No. 10, Oct. 1978, pp. 923–926.
J. N. Wilson et al., "Functional Specification of Neighborhoods in an Image Processing Language", SPIE vol. 804, Advances in Image Processing (1987), pp. 98–103.
S. D. Shapiro, "Properties of the Transformer for the detection of Curves in Noisy Pictures", Comp. Graphics and Image Processing, vol. 8, 1978, pp. 219–236.
R. O. Duda et al., "Pattern Classification and Scene Analysis"; John Wiley & Sons, 1973.

*Primary Examiner*—Leo H. Boudreau
*Assistant Examiner*—Andrew W. Johns
*Attorney, Agent, or Firm*—Philip J. Feig

[57] ABSTRACT

Geometric features in image data are extracted by correlation of local information contained in multiple neighborhoods or windows comprising the image. Features of interest are extracted from data contained in the neighborhoods. Nodes are created for each feature. Support values are assigned to each node as well as a list of neighborhoods containing the feature parameters. Inhibitory links are built between the nodes based upon the list of neighborhoods and the geometric properties of the feature. Competitive integration is performed until the surviving nodes are no longer connected by inhibitory links. The result is a complete segmentation of the image in terms of the features.

18 Claims, 3 Drawing Sheets

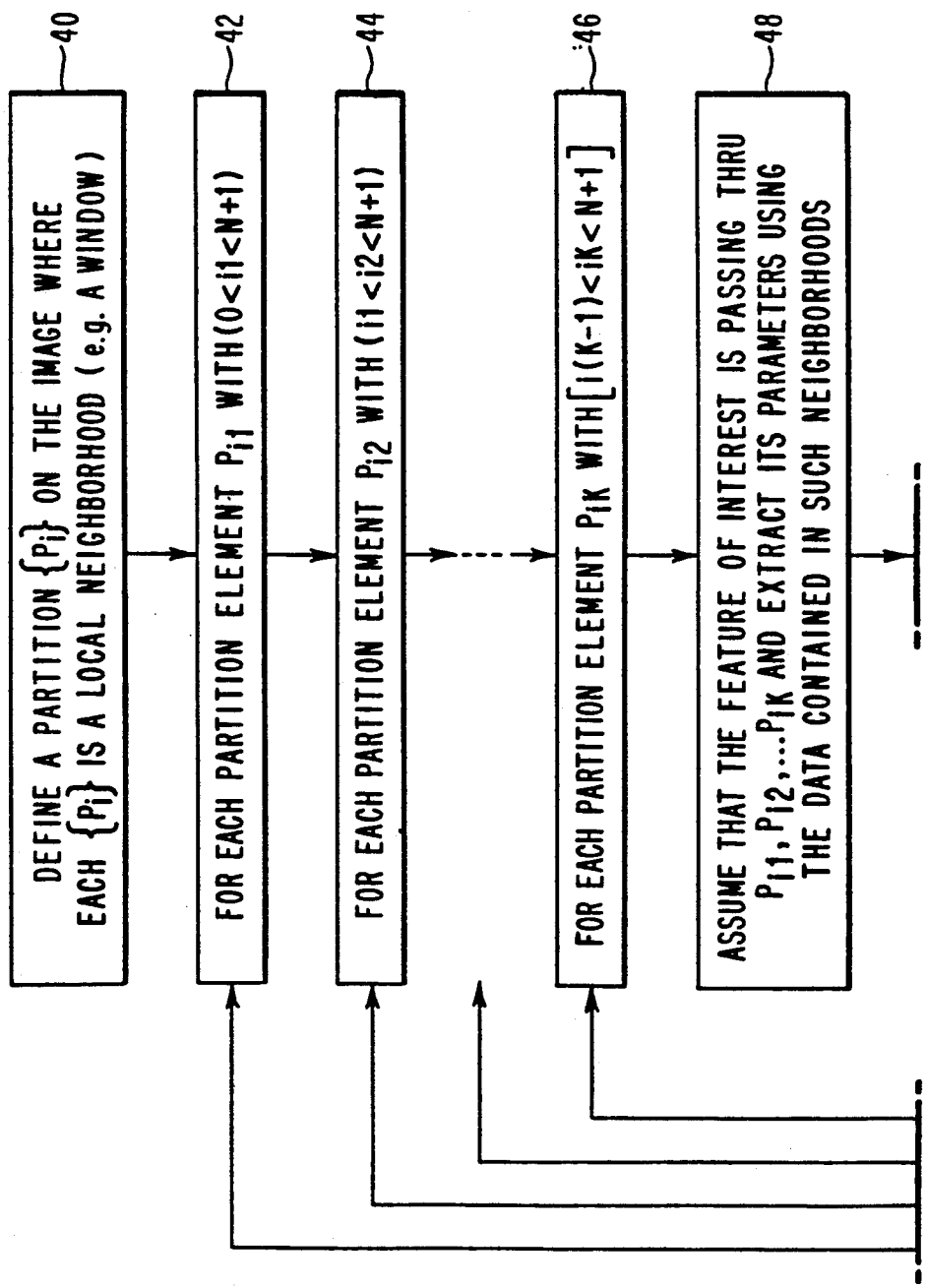

GENERALIZED NEIGHBORHOODS PARAMETER TRANSFORM FOR IMAGE FEATURES EXTRACTION

BACKGROUND OF THE INVENTION

The present invention relates to the recognition of geometric features in image data. Specifically, the invention relates to a generalized neighborhood concept that allows the use of correlation of local information from different portions or neighborhoods of an image in order to provide enhanced capabilities of extracting features from the image data. Quite specifically, the invention is based on the correlated use of multiple neighborhoods. The data contained in such neighborhoods are provided as an input to a parameter transform to produce a density function in the parameter space of the feature. Through a competitive process extracted features, statistically linked with portions of the image, are isolated from noise in the image. The result is a complete segmentation of the image in terms of the features as well as the parametric description of such features.

The invention is useful in computer vision for recognition of objects in image data. Some applications include printed circuit board inspection, medical images recognition, photographic or other image analysis.

Parameter transforms play a very important role in the recognition of geometric features in image data. Local operators devised to compute parametric descriptions of geometric entities using a small neighborhood w(x,y) about points of interest have been successfully employed.

In a typical feature extraction paradigm, a parameter transform is used to detect possible instances of a feature in the image data. A small neighborhood operator is devised to locally extract the parameters of the feature. The resultant local feature estimates are subsequently combined globally in order to find the geometric features. These techniques have been successfully employed, to detect, for example, lines and circles. However, detecting more complicated features has proven to be difficult.

Operators of the type described fail to exploit the long distance correlation present in the image, i.e. distant points belonging to the same geometric feature. The parameter transforms become increasingly sensitive to noise as the differential order of the geometric properties, e.g. position, direction, curvature, torsion, etc., increase. That is, to extract complex geometric features, the transforms rely on extracting higher order geometric properties using small neighborhood operators; these operations are extremely noise sensitive. Such techniques are described, for instance, in the articles "Use of the Hough Transform to Detect Lines and Curves in Pictures" by R.O. Duda and P. E. Hart, Comm. of the ACM, Vol. 15, No. 1, January 1972, pp. 11-15; in the book "Pattern Classification and Scene Analysis", by R. O. Duda and P. E. Hart, John Wiley & Sons, 1973; U.S. Pat. No. 3,069,654 entitled "Methods and Means for Recognizing Complex Patterns"; in the article by C. Kimme, D. Ballard and J. Slansky entitled "Finding Circles by an Array of Accumulators", Comm. of the ACM, Vol 18, No. 2, February 1975, pp 120-122; in the article by S. D. Shapiro entitled "Properties of the Transform for the Detection of Curves in Noisy Pictures", Comp. Graphics and Image Processing, Vol. 8, 1978, pp. 219-236; in the article by S. D. Shapiro entitled "Feature Space Transforms for Curve Detection", Pattern Recognition, Vol. 10, 1978, pp. 129-143; and in the article by J. Slansky entitled "On the Hough Transform for Curve Detection", IEEE Trans. on Comp., Vol. 27, No. 10, October 1978, pp. 923-926.

The generalized neighborhood approach, by correlating local information over different portions of the image, produces up to two orders of magnitude improvement in accuracy over conventional techniques. In the present invention, the results of the transform are filtered by the introduction of competitive processes in the parameter spaces of the type sometimes used in connectionist networks. A technique is designed for the generation of lateral inhibition links in the network, consistent with the generalized neighborhoods concept. Based on statistical coupling between features and portions of the image, features that occupy overlapping portions of the image compete so that, at the end of the process, only non-overlapping features survive, thus resulting in an implicit segmentation of the scene. Generalized neighborhood techniques are described in the article by A. Califano entitled "Feature Recognition Using Correlated Information Contained in Multiple Neighborhoods", in Proc. 7th AAAI Nat'l Conf. on Artificial Intell., St. Paul, Minn., Aug. 21-26, 1988, pp. 831-836 and in the article by A. Califano, R. M. Bolle, R. W. Taylor entitled "Generalized Neighborhoods: A New Approach to Complex Parameter Feature Extraction", IBM Tech. Report RC 14305.

The computational complexity of the technique expands linearly with the area of the image, and the method is completely parallel.

SUMMARY OF THE INVENTION

A principal object of the present invention is, therefore, the provision of a method for extracting geometric features from image data using long distance correlation.

Another object of the invention is the provision of a method which by means of generalized neighborhoods on an image uses long distance correlation to extract geometric features.

A further object of the invention is the provision of a method of extracting features from image data by means of a recognition network.

Further and still other objects of the invention will become more clearly apparent when the following description is read in conjunction with the accompanying drawings.

DETAILED DESCRIPTION

Generalized Neighborhoods

In order to provide a better understanding of the invention, generalized neighborhoods and their use in conjunction with parameter transforms will be described.

Figure 1:
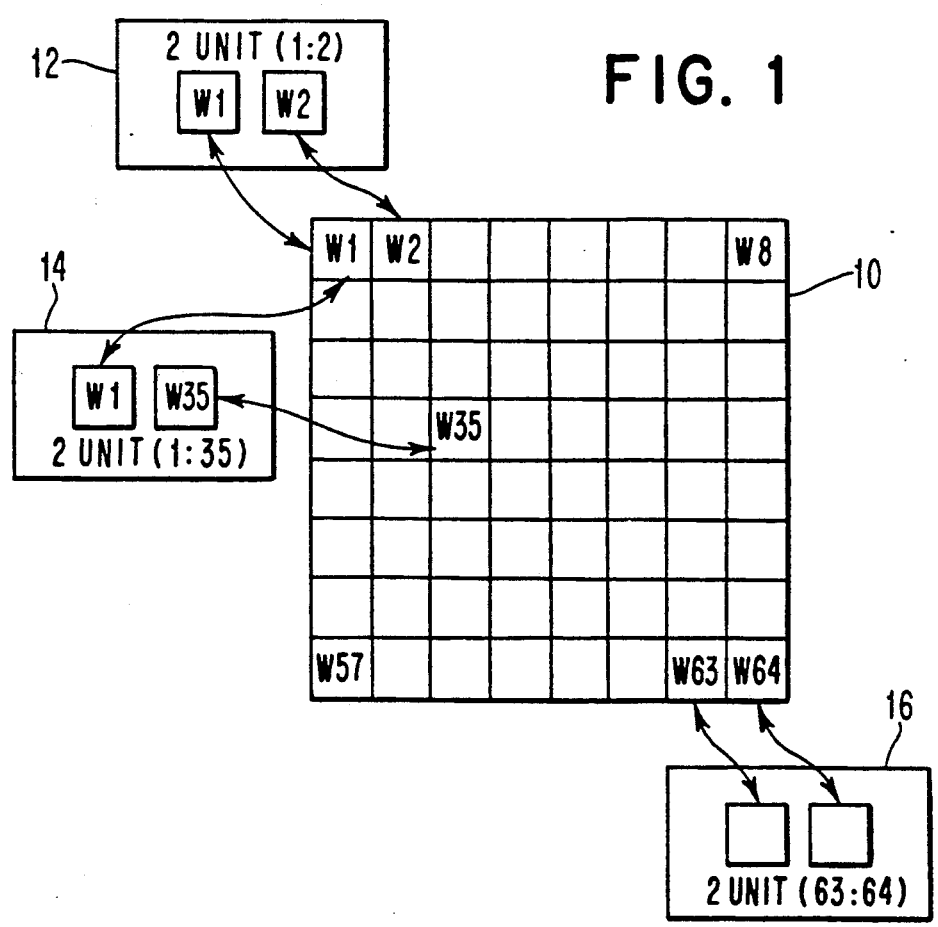
FIG. 1 is a graphical representation of a two-dimensional image comprising neighborhoods.

Referring now to the figures, and to FIG. 1 in particular, there is shown a two-dimensional image 10 in which each point (x,y) has an associated value z (e.g. intensity, range, etc.). The expression w(x,y) represents a local neighborhood centered about the point (x,y) which neighborhood is small compared to the image size. A partition of the image, i.e. a set of, possibly overlapping, neighborhoods that cover the entire image, is expressed as $P=\{w(x_i,y_i)|=1,\ldots,L\}$. For the set P, it is possible to define as a "multi-partition" of size K, $MP_K$, the set of all possible unique combinations of neighborhoods w(x,y) in groups of K. Each element i of the multi-partition $MP_K$ is therefore the union of K of the local neighborhoods $w(x_{i1},y_{i1}), w(x_{i2},y_{i2}), \ldots, w(x_{ki},y_{ik})$. The term "generalized neighborhood" will be understood to indicate an element of $MP_K$, where $$MP_K = \{w(x_i,y_i) \cup w(x_j,y_j) \cup \ldots \cup w(x_k,y_k) | i=1 \ldots L, j=i+1 \ldots L \ldots \}. \quad (1)$$

An example is a discrete image of size N×N where P is the set of L non-overlapping windows of size M×M, [$L=(N/M)^2$ is an integer]. By taking all possible combinations of two such windows, a multi-partition $MP_2$ of size two is generated. As shown in FIG. 1, 12,14,16 are typical 2-units 12,14,16. There are $$n = \frac{L(L-1)}{2}$$

such 2-units in the image. In general, the total number n of unique elements of a multi-partition $MP_K$ of size K, generated from L local neighborhoods is given by:

$$n = \binom{L}{K} = \frac{L!}{(L-K)!K!} \quad (2)$$

For convenience, the term "unit" is used to indicate a local neighborhood and "K-unit" is used to indicate one of the generalized neighborhoods obtained by combining K local neighborhoods in one group. The terms unit and 1-unit are synonyms. In the above example, since K=2, the generalized neighborhood elements are referred to as 2-units.

Nonlocal Parameter Transforms

The data points contained in one of the generalized neighborhoods can be used as an input to a feature extraction operator in two ways. One way is to use the combined data in the K-units and apply the feature extraction directly to that data. An alternative way is to use the data in each of the 1-units, extract local properties, and combine the extended local properties to obtain more global properties.

An example of the first case is to locate lines from an edge map. Since a line is determined by two distinct points on the line, a line-locator in two-dimensional space can be implemented by fitting lines to all combinations of two windows (2-units) that contain edge points.

Using a neighborhood size of one pixel, an implementation in lisp of such an operation is as follows:

```
(defparameter *image* (make-array '(N N))
(defun list-of-extracted-parameters (*image*)
 (let
  ((*result* nil))
```

```
(loop for x1 from 0 below N do
 (loop for y1 from 0 below N do
  (when
   (is-edge-element (aref *image* x1 y1))
   (loop for x2 from (1+ x1) below N do
   (loop for y2 from y1 below N do
    (when
     (is-edge-element (aref *image* x2 y2))
     (let
      ((angle (angle-with-x-axis x1 y1 x2 y2))
       (distance (distance-from-origin x1 y1 x2 y2)))
      (push (list angle distance) *result*)))))))))
 *result*))
```

A line is extracted from the image by considering each neighborhood with every other neighborhood in the image. If an edge element is present in both neighborhoods being considered, a hypothesis for a line passing through the center points of both neighborhoods is created and the result is stored. When all the neighborhoods have been considered with all the other neighborhoods, the resultant "line hypotheses" are clustered based upon their parameters (e.g. angle with x-axis and distance from origin) to determine the likelihood of the existence of the lines. Line hypotheses that have been "voted for" by many generalized neighborhoods have a higher probability of being present in the image.

An example of the second case is to locate the center of a sphere from range data using two windows or neighborhoods (2-unit) on the surface of the sphere. The surface normal $N_i=[N_{ix}, N_{iy}, N_{iz}]$ and the surface patch center position $P_{i0}=[x_{i0},y_{i0},z_{i0}]$ relative to the neighborhood are estimated from the data contained in each of the two windows (i=1,2) and used to define two lines in 3-dimensional space, the locus of whose points are defined by:

$$P_i = t_i N_i + P_{i0} \quad (3)$$

The described technique does not require the extraction of any second order properties of the spherical surface such as its curvature. In view of the symmetry of the spherical surface, the two lines should ideally pass through the center of the sphere $P_c$. However, due to quantization and the inexact fit of the surface patches, the two lines are closest in correspondence to the center $P_c$. Thus, $P_c$ is estimated as the center point of the shortest line segment between the two lines, which can be computed using simple constrained minimization techniques.

Linearized Computational Time

Figure 2:
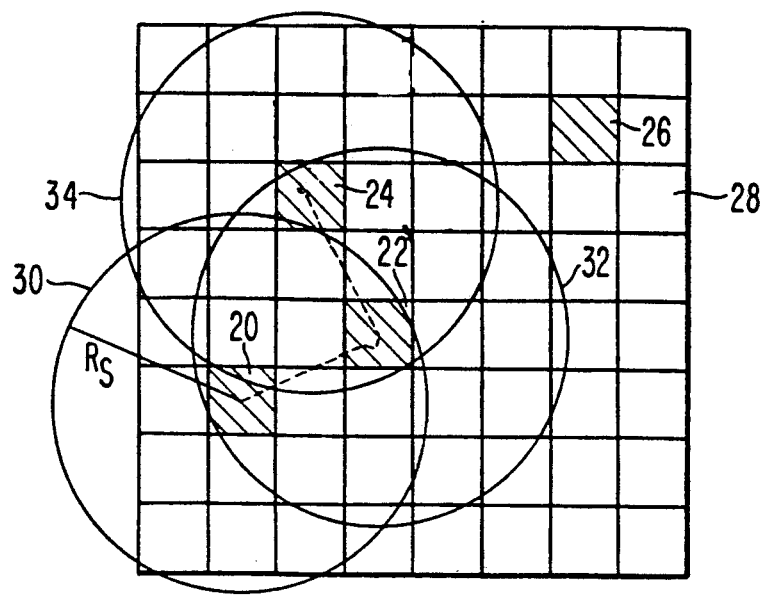
FIG. 2 is a graphical representation of neighborhoods in an image and radii of coherence.

Computational time is proportional to the quantity of elements in the multi-partition. Thus, it is important to reduce the combinatorial explosion implicit in equation 2 above, with increasing image size, to a linear growth. In order to achieve the reduction, a search radius $R_s$ is introduced such that each of the neighborhood's center points (x,y), in a K-unit, is within a distance $R_s$ from the center point of at least one other K-unit. Shown in FIG. 2, for example, are neighborhoods 20,22,24, and 26 located in an image 28. Superimposed are circles 30,32,and 34 having a radius equal to the search radius $R_s$ and having their centers at the center of neighborhoods 20,22, and 24 respectively. The neighborhoods 20,22, and 24 form a 3-unit whereas neighborhoods 20,22 and 26 cannot form a 3-unit because neighborhood 26 is outside the circles 30 and 32.

The radius $R_s$ can be considered the distance over which it is expected that two neighborhoods contain coherent information. Therefore, $R_s$ can be thought of as a radius of coherence. If $N_R$ is the total quantity of 1-units (local neighborhoods) contained within a circle of coherence of radius $R_s$, then depending upon the metric selected in order to define the circle of coherence, the number n of possible K-units generated by keeping the first unit fixed and selecting other neighborhoods within $R_s$ from each other is:

$$N_R \leq n \leq (N_R - 1)^K \qquad (4)$$

which is independent of L, the total number of units on the image. Thus the total quantity of K-units $N_{tot}$ becomes L multiplied by n since there are L possible choices for the first unit. $N_{tot}$ is now a linear function of the image partition size L and thus of the image size itself. However, equation 4 shows a combinatorial explosion with respect to K. As a result, only very small values of K are practical (typically $K \leq 4$).

It should be noted that the above definition of the radius of coherence permits K-units to extend over distances much larger than $R_s$ depending upon the value of K. In fact, it is not required that all the units have centers within the radius of coherence but only that a sequence can be established of the K-unit ordering such that the center of each 1-unit is within a distance $R_s$ from the next 1-unit in the sequence. Therefore, if K is greater than 1, chains of units of maxiumum length $KR_s$ can be formed thereby permitting the extraction of long distance correlation.

Enhanced Accuracy of Parameter Estimation

The usual approach for the recognition of complex geometric features in images is to introduce a parametric description of the features of interest, then to devise an operator which extracts the corresponding parameters from sets of image data. The actual computation is carried out in two stages. In the first stage, referred to as mapping or voting, the operator is applied to a large number of data sets (neighborhoods) in an image in order to generate a density in parameter space. In the second stage, referred to as clustering, the statistical properties of the density are exploited to find clusters in parameter space which correspond to image features.

The accuracy of a mapping operator increases with the number of input data points. Hence, on average, a generalized neighborhood of size K contains K times more data points than a local neighborhood, thus there is a corresponding increase in the extraction accuracy.

In fact, there are two possible configurations for a K-unit. Either the 1-units comprising the K-unit contain data points on the same geometric feature or at least one of the 1-units comprising the K-unit contains data points on a different feature. In the first case, K times more points can be used for the parameter estimation than with a single neighborhood, thus a much better parameter estimate will contribute to the cluster for the corresponding feature. In the second case, the resulting estimate has a random value; thus it will not usually contribute to the formation of clusters in parameter space.

Another factor contributing to enhanced accuracy in the mapping process is that distant points on the same feature are jointly used. Due to the complexity of mapping models, quantification of the contribution of this factor is difficult. The analytic result in the case of two-dimensional line fitting is described in Califano and Califano et al supra.

In certain applications, particularly those with small image sizes or low-dimensional features, the quantity of units involved in the local parameter extraction is extremely small. For example, if there are 24 data points on a one-dimensional feature such as a curve and nonoverlapping windows of size 3 are formed, there are only approximately eight votes to generate a cluster in parameter space. It should be apparent that such a small quantity, particularly in the case of complex parameterization and/or noisy data is too small to distinguish between clusters and noise.

The generalized neighborhood concept results in an increased number of computational units. In the example where a feature is contained in L units, the total quantity of K-units that contain feature data is given by equation 2 above. In the pieceeding example, using groups of two windows will result in approximately 56 points in the cluster which is a much more significant sample size.

Coupling

The total number of K-units containing a particular 1-unit, w(x,y), is $$n = \frac{1}{L}\binom{L}{K} = \frac{(L-1)!}{(L-K)!K!} \qquad (5)$$

where L is the total quantity of 1-units. Hence, each unit is shared in a quantity of K-units which can be used to generate a sub-density in parameter space. That is, it is possible to establish a probablistic coupling between any 1-unit and the features that are extracted from the K-units that contain such 1-unit. The height of the subdensity, for any feature hypothesis, is proportional to the confidence that the corresponding feature is present in the image element associated with the 1-unit.

For example, if w(x,y) is a 1-unit located on the intersection of two different lines in the image, the sub-density associated with w(x,y) has two peaks, one corresponding to each line.

Alternatively, if a single line passes through on 1-unit, the associated sub-density has only one peak.

The sub-density information permits the coupling of features to units in image space, using a probabilistic approach, and the discarding of incompatible features with a mechanism (recognition networks) described hereinafter which is responsible for the intrinsic segmentation of the image.

Recognition Networks

As a result of various noise sources and the correlated noise created by the interaction of different features in the input, a large quantity of potential features (hypotheses) is generated. Each hypotheses corresponds to a noisy, erroneous or existing image feature. Moreover, any pair of feature hypotheses can be mutually conflicting, supporting or simply noninteracting. In order to provide an overall consistent interpretation of the image, a "competitive integration" mechanism related to connectionist networks is used. Connectionist networks are described in the article by J. A Feldman and D. H. Ballard entitled "Connectionist Models and their Properties", Cognitive Science, Vol. 6. 1982, pp. 205–254 and the article by D. Sabbah entitled "Computing with Connections in Visual Recognition of Origami Objects", Cognitive Science, Vol 9, No. 1, January–March 1985, pp. 25–50.

The links in the network are bottom-up connections between computational 1-units (from the K-units that computed the hypotheses) and the nodes, and links between nodes themselves. When the hypotheses are conflicting the latter links are inhibitory, and when the hypotheses support one another the latter links are excitory.

The idea is to form "winner-take-all" sub-networks of computing hypotheses, assign activation levels to the nodes and iteratively refine the activation level. Actual features in the image must correspond to nodes in separate winner-take-all sub-networks which, through inhibition and excitation, survive the iterative refinement. It should be apparent that the proper inhibition/excitation link structure is a crucial factor in setting up the network. Previous implementations of recognition networks have used the notion of "closeness" in parameter space to define inhibition levels. Such an approach has several limitations. The present invention defines a more complex interaction model based upon the concept that no two distinct features of the same type can occupy the same portion of the image space at the same time. "Winner-take-all" networks and their limitations are described in Feldman et al, Sabbah and Califano supra.

Consider two feature hypotheses $F_1$ and $F_2$ where the sets of image data points supporting the hypotheses are $I_{F1}$ and $I_{F2}$ respectively. If the union of $I_{F1}$ and $I_{F2}$ is relevant with respect to either $I_{F1}$ or $I_{F2}$ and geometrical knowledge makes $F_1$ and $F_2$ possible candidates for competition, then a lateral inhibition link is instantiated between the two corresponding nodes. It should be noted that features must be of the same type, for instance a line L (boundary) can be completely contained in a planar surface PL so that, even if $I_L$ is completely contained in $I_{PL}$, no competition arises. On the contrary, if for two different surfaces $S_1$ and $S_2$, $I_{S1}$ is completely contained in $I_{S2}$, the features are incompatible, and in fact two surfaces cannot be bound to the same image area. Due to noise and the finiteness of 1-units, intersection points of curves or surfaces can support either one of the intersection features. Therefore, a check for compatibility of features that share a small subset of the respective supporting image areas is required. In such a case, it is possible to use the stable part of the parameterization of the features to differentiate between compatible and incompatible sharing of image data. For example, if two lines share some bottom up support, it is possible to use their respective angles $\theta$, which are stable parameters, to decide whether the lines have to compete. The stability concept is described in the article by A. M. Liapounov entitled "Probleme Generale de la Stabilite du Mouvement", Annals of Math. Studies, No. 17, Princeton University Press, 1947 and in Califano et al supra.

It should be noted that the technique is possible only because of the probabilistic link between image regions (1-units) and parametric features provided by the use of generalized neighborhoods. In fact, by definition, the K-unit structure permits different hypotheses to be supported by the same 1-unit. After the competitive process since no two features can share the same portion of the image, the result is an implicitly segmented image together with the parametric description of the extracted features.

Figure 3B:
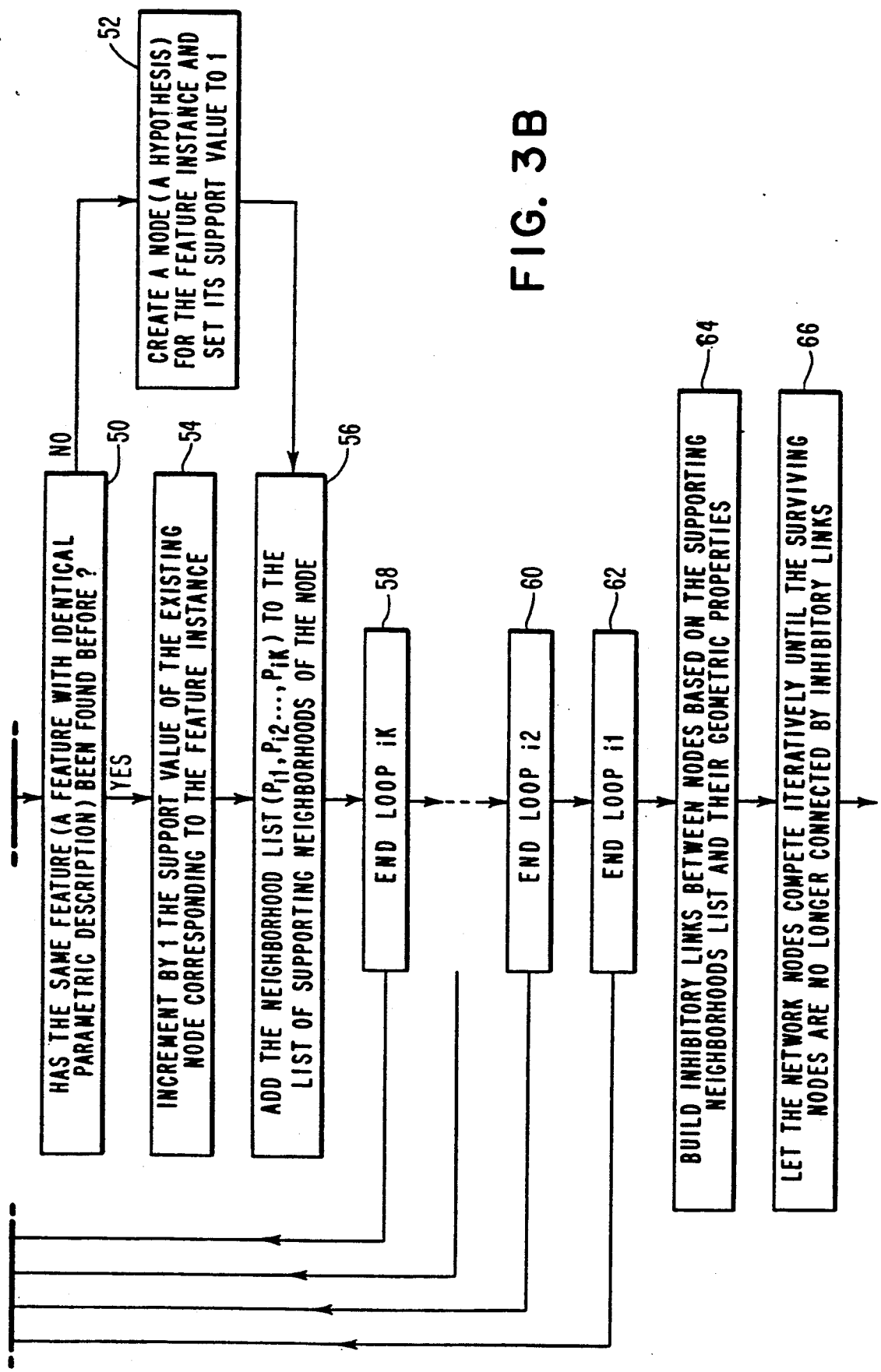
FIG. 3 is an illustration of the connection of FIGS. 3A and 3B which combined is a flow diagram of the present invention.

FIG. 3 is flow diagram of the present invention. The process begins at box 40 where a partition $\{P_i\}$ of the image is defined where each $P_i$ is a partition element, i.e. a local neighborhood, e.g. a window. Each partition element is combined with each other partition element. In box 42, initially the partition element $P_{i1}$ with $0 < i1 < N+1$ is selected. In box 44, another partition element $P_{i2}$ with $i1 < i2 < +1$ is selected. The process continues until box 46 where the last partition element $P_{ik}$ with $i(k-1) < ik < N+1$ is selected.

It is assumed in step 48 that the feature of interest is contained in or passes through the neighborhood $P_{i1}$, $P_{i2}, \ldots, P_{iK}$ and the feature parameters are extracted using the data contained in all of such neighborhoods. In step 50 a decision is made whether an extracted feature with identical parametric description has been found previously. If the feature has not been previously found, a network node (i.e. a hypothesis) for the newly found feature is created at step 52, and the initial support value assigned to the node is 1. If the feature has been previously found, the support value of the existing node corresponding to the feature with the identical parametric description is incremented by 1 in step 54. In step 56 the neighborhoods $P_{i1}, P_{i2}, \ldots, P_{ik}$ are added to the list of neighborhoods supporting the appropriate node corresponding to the particular extracted feature.

The loops are ended for the iK, . . . ,i2,i1 loops in boxes 58, 60 and 62 respectively after each neighborhood has been coupled to every other neighborhood and the feature parameters have been extracted.

After all the neighborhoods have been examined and nodes corresponding to each extracted feature are created, inhibitory links are built between nodes in step 64 based upon the supporting neighborhood lists formed in step 56 and the geometric feature extracted.

After the nodes and inhibitory links are formed, the nodes compute iteratively in step 66 based upon connectionist network techniques until the surviving nodes are no longer connected by inhibitory links.

The building of inhibitory links and competitive integration are described above.

The final result is an output indicative of specific geometric features and their respective locations in an image. The process relies upon the coupling of remotely disposed neighborhoods when extracting features, creating nodes for each extracted feature, building inhibitory links between the nodes and having the nodes iteratively compete to yield a segmentation of the image in terms of features and feature locations.

In summary, the present invention uses generalized neighborhoods to provide several mechanisms to enhance feature extraction in an image with respect to existing techniques. These mechanisms are the use of more data points in each parameter estimation, the use of data points remotely disposed on a single feature for the extraction of a feature, and the increased quantity of computational units that produce clusters in parameter space for the extraction of the feature.

While there has been described and illustrated a preferred method of extracting geometric features in images, it will be apparent to those skilled in the art that variations and modifications thereof are possible without deviating from the broad principles of the invention which shall be limited solely by the scope of the claims appended hereto.

What is claimed is:

1. An image feature extraction system for extracting geometric features from an image comprising:

partitioning an image into a set of neighborhoods;
coupling a first neighborhood with at least one second neighborhood and extracting parameters of features contained in said first and second neighborhoods in order to identify features in said first and second neighborhoods;
creating a node associated with each identified feature if such node does not already exist and assigning an initial support value to said node;
changing said support value whenever a node already exists for an identified feature;
performing clustering on said nodes in parameter space to eliminate nodes for noisy and erroneous features; and
providing an output indicative of an image feature in the image.

2. An image feature extraction system as set forth in claim 1, wherein said providing an output provides an output indicative of an image feature and the location of the feature in the image.

3. An image feature extraction system as set forth in claim 1 wherein said partitioning results in a set of generalized neighborhoods $MP_K$ where $$MP_K = \{w(x_i,y_i) \cup w(x_j,y_j) \cup \ldots \cup w(x_k,y_k) | i=1 \ldots L, j=i+1 \ldots L \ldots \}$$

where $w(x,y)$ is a local neighborhood centered about the point $(x,y)$, L is the quantity of neighborhoods and K is the size of the groups of the multi-partitions of the L neighborhoods.

4. An image feature extraction system as set forth in claim 1 wherein said coupling of a first neighborhood to at least one second neighborhood couples neighborhoods whose center points are located within a predetermined distance from one another.

5. An image feature extraction system as set forth in claim 4, wherein said predetermined distance is a radius of coherence.

6. An image feature extraction system as set forth in claim 1 wherein said performing clustering comprises:
listing for each node neighborhoods used for extracting the parameters of the associated identified feature;
building inhibitory links between said nodes to form a network; and
performing competitive integration until the surviving nodes are no longer connected by said inhibitory links.

7. An image feature extraction system as set forth in claim 2 wherein said partitioning results in a set of generalized neighborhoods $MP_K$ where $$MP_K = \{w(x_i,y_i) \cup w(x_j,y_j) \cup \ldots \cup w(x_k,y_k) | i=1 \ldots L, j=i+1 \ldots L \ldots \}$$

where $w(x,y)$ is a local neighborhood centered about the point $(x,y)$, L is the quantity of neighborhoods and K is the size of the groups of the multi-partitions of the L neighborhoods.

8. An image feature extraction system as set forth in claim 2 wherein said coupling of a first neighborhood to at least one second neighborhood couples neighborhoods whose center points are located within a predetermined distance from one another.

9. An image feature extraction system as set forth in claim 8, wherein said predetermined distance is a radius of coherence.

10. An image feature extraction system as set forth in claim 2 wherein said performing clustering comprises:
listing for each node neighborhoods used for extracting the parameters of the associated identified feature;
building inhibitory links between said nodes to form a network; and
performing competitive integration until the surviving nodes are no longer connected by said inhibitory links.

11. A process of extracting geometric features from an image comprising:
partitioning an image into a set of generalized neighborhoods $MP_K$ where $$MP_K = \{w(x_i,y_i) \cup w(x_j,y_j) \cup \ldots \cup w(x_k,y_k) | i=1 \ldots L, j=i+1 \ldots L \ldots \}$$

where $w(x,y)$ is a local neighborhood centered about the point $(x,y)$, L is the quantity of neighborhoods and K is the size of the groups of the multi-partitions of the L neighborhoods;
coupling a first local neighborhood with at least one second local neighborhood where the center point of said first and said second local neighborhoods are located within a predetermined distance from each other in order to identify features in said first and second neighborhoods having predetermined parametric description;
creating a node associated with each identified feature if such node does not already exist and assigning an initial support value to said node;
changing said support value whenever a node already exists for an identified feature;
performing clustering on said nodes in parameter space to eliminate nodes for noisy and erroneous features; and
providing an output indicative of an image feature in the image.

12. A process for extracting geometric features from an image as set forth in claim 11 wherein said providing an output provides an output indicative of an image feature and the location of the feature in the image.

13. A process for extracting geometric features from an image as set forth in claim 11 wherein said predetermined distance is a radius of coherence.

14. A process for extracting geometric features from an image as set forth in claim 11 wherein said changing said support value is incrementing said support value.

15. A process for extracting geometric features from an image as set forth in claim 11 wherein said performing clustering comprises:
listing for each node neighborhoods used for extracting the parameters of the associated identified feature;
building inhibitory links between said nodes to form a network; and
performing competitive integration until the surviving nodes are no longer connected by said inhibitory links.

16. A process for extracting geometric features from an image as set forth in claim 12 wherein said predetermined distance is a radius of coherence.

17. A process for extracting geometric features from an image as set forth in claim 12 wherein said changing said support value is incrementing said support value.

18. A process for extracting geometric features from an image as set forth in claim 12 wherein said performing clustering comprises:
  listing for each node neighborhoods used for extracting the parameters of the associated identified feature;
  building inhibitory links between said nodes to form a network; and
  performing competitive integration until the surviving nodes are no longer connected by said inhibitory links.

* * * * *